(12) United States Patent
Pelfrey

(10) Patent No.: US 6,524,518 B1
(45) Date of Patent: Feb. 25, 2003

(54) MANUFACTURING PROCESS INCLUDING EXTRUSION WITH IN-LINE BLOW MOLDING

(75) Inventor: Paul R. Pelfrey, Wheelersburg, OH (US)

(73) Assignee: Crane Plastics Company LLC, Columbus, OH (US)

(*) Notice: Subject to any disclaimer, the term of this patent is extended or adjusted under 35 U.S.C. 154(b) by 0 days.

(21) Appl. No.: 09/510,764

(22) Filed: Feb. 23, 2000

(51) Int. Cl.[7] .............................................. B29C 49/64
(52) U.S. Cl. ..................... 264/521; 52/301; 52/720.2; 52/736.1
(58) Field of Search ........................... 264/521; 52/301, 52/720.2, 736.1; 428/35.7, 36.9

(56) References Cited

U.S. PATENT DOCUMENTS 2,876,496 A * 3/1959 Murphy ...................... 264/294
4,518,340 A * 5/1985 Jakobsen et al. ............ 425/593

* cited by examiner

*Primary Examiner*—Suzanne E. McDowell
(74) *Attorney, Agent, or Firm*—Standley & Gilcrest LLP

(57) ABSTRACT

The present invention is a unique manufacturing process that includes extruding a product shape through extrusion equipment, then using a blow molding process, preferably in-line, on a portion of the extruded product shape to further shape the product. In one preferred embodiment the product shape is a post and the further shaping of the post results in a decorative end that previously had to be assembled to the post but now is able to be formed in the post as a one-piece product, instead of a two-piece construction.

10 Claims, 2 Drawing Sheets

MANUFACTURING PROCESS INCLUDING EXTRUSION WITH IN-LINE BLOW MOLDING

BACKGROUND AND SUMMARY OF THE INVENTION

The present invention relates generally to the field of manufacturing processes, and more particularly, to a manufacturing processes that includes an extrusion step and a blow molding step in-line, to produce a resultant product. The present invention may be useful in the manufacturing of a multitude of different products, product shapes, product configurations, and may be used with any materials which are suitable for extrusion and blow molding processes.

Extrusions of material, especially plastic material, are well known. For example, a class of plastics, known as thermoplastic material, has been commonly extruded through extrusion equipment that is widely available. An example of such extrusion equipment is a Cincinnati Milacron Model CM80 Extruder. Those skilled in the art of extrusion of materials are well versed in the workings of extruders and the use of materials in such extruders as well as the use of various dies to produce resultant shapes at the finish point of the extruder. For example, in a customary use of extruders, raw materials are provided to the extruder along with other additives and lubricants known to those of skill in the art, then passed through the extruder and subjected to heat and compression causing the combination of materials to form a mass of flowing material that passes through one or more dies of predetermined shape. The material is pushed by the extruder through the dies and exits the dies in the desired shape, where the material is then left to cool and harden into a more rigid product. As is well known to those of skill in the art of extruding, dies may be designed to result in the formation of hollows in a finished extruded part. Extruded products having hollows simply means that the part is not solid material all the way through, but instead has a hollow section within it.

The art of blow molding and blow molding processes are also well known to those of ordinary skill in the art of blow molding. Blow molding is also associated with plastics and the use of heat and pressure to form a product having a resulted pre-determined shape. A mold is formed with the desired shape, the material is placed in the mold, and is then subjected to air pressure to blow the material into the shape of the mold. The equipment used in the blow molding process is well known to those of ordinary skill in the art.

The present invention involves the combination of an extrusion process and a blow molding process to achieve a desired end product. With the present invention, material is first extruded through one or more dies and upon exiting the die(s) the material shape is subjected to a blow molding process to achieve a further shaping of the material. The material shape that exits the extruder die(s) may be allowed to cool before it is later re-heated in the blow molding process.

This two part manufacturing process of extruding and later (may be just a few moments later) blow molding the same end product is adaptable for use in the manufacturing of a wide variety of end products. An example of such an end product is a fence post or rail post. It has been known to extrude plastic material to form fence posts and rails for use in decorative and/or protective fences that were traditionally made from wood or metal. A relatively simple die configuration in an extrusion process can be used to extrude a hollow fence post or hollow rail out of plastic or other extrudable material. Likewise, a solid post or rail may be manufactured from an extrusion process with the proper dies, and used in the present invention.

It has been known to create decorative end-caps for fence posts and rail posts in a separate manufacturing process, such as injection molding. Such injection molded end-caps are later assembled in an assembly step to the extruded fence post or rail post. This additional assembly step requires extra time and manpower to complete. Furthermore, the end-caps are susceptible to later becoming disengaged from the fence post or rail post and being lost or damaged.

In one embodiment of the present invention, a hollow fence post or rail post is extruded in a traditional extruder and one end of the extruded post is later placed in a blow mold while air is injected through the other end of the post causing the heated/semi-flowable post material to fill the void created by the blow mold and thereby take the shape of the blow mold cavity as the material cools. The mold itself is later removed and the result is a hollow fence post having a decorative end, all in one-piece construction, requiring no assembly, and having the same aesthetic appearance as the former two step process of assembling a decorative end-cap onto a previously existing fence post or rail post.

The invention may be better understood from viewing the following drawings and additional detailed description.

DETAILED DESCRIPTION OF PREFERRED EMBODIMENT(S)

Figure 2:
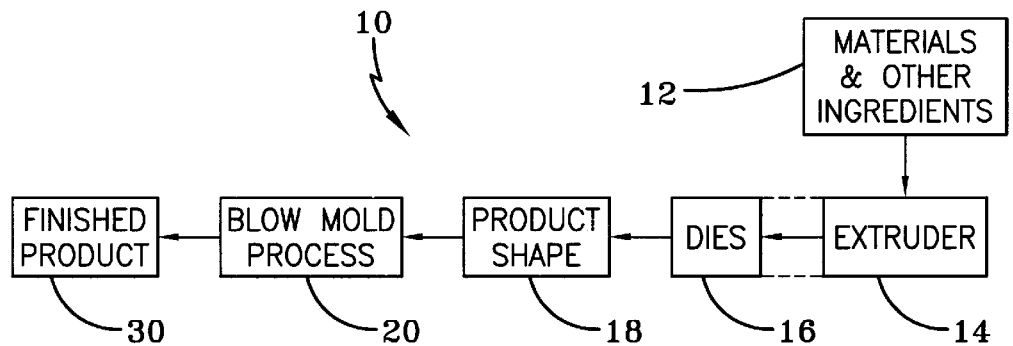
FIG. 2 is a schematic diagram of the process steps of a preferred embodiment of the present invention.

Referring now to the drawings, there is shown in schematic form in FIG. 2, a preferred embodiment of the process steps 10 of the present invention. Material 12 may be added to a traditional extruder 14 and processed through the extruder to one or more dies 16 of predetermined shape. As the material exits the extruder dies it takes the shape 18 as determined by the dies. The material may be allowed to cool partially or totally, and subsequently subjected to a blow molding process step 20. The blow molding step 20 comprises the use of a blow mold 22 of predetermined shape.

Figure 3A:
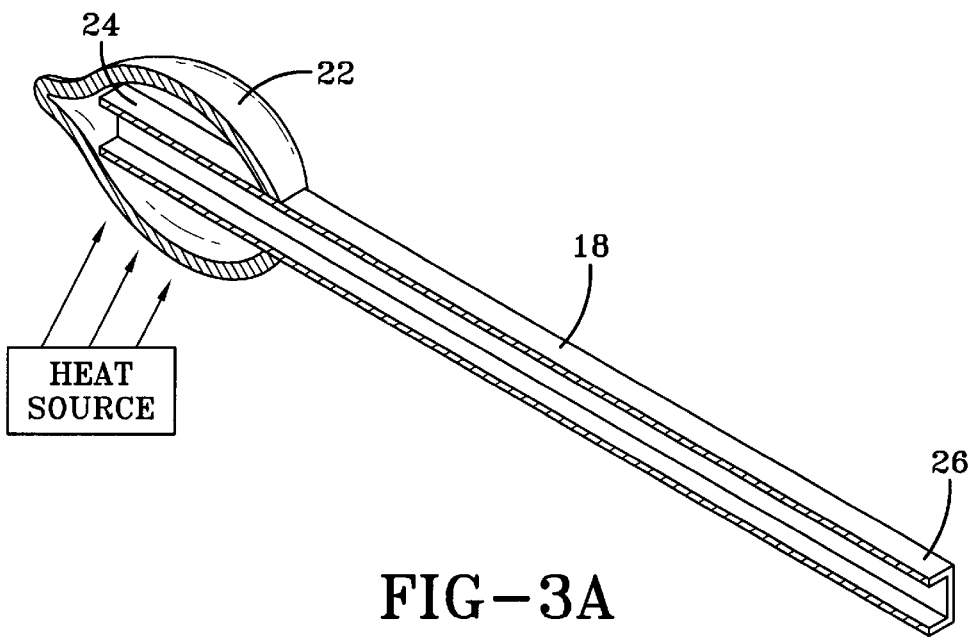
FIG. 3 is a perspective view of blow molding steps of a preferred embodiment of the present invention.
Figure 3B:
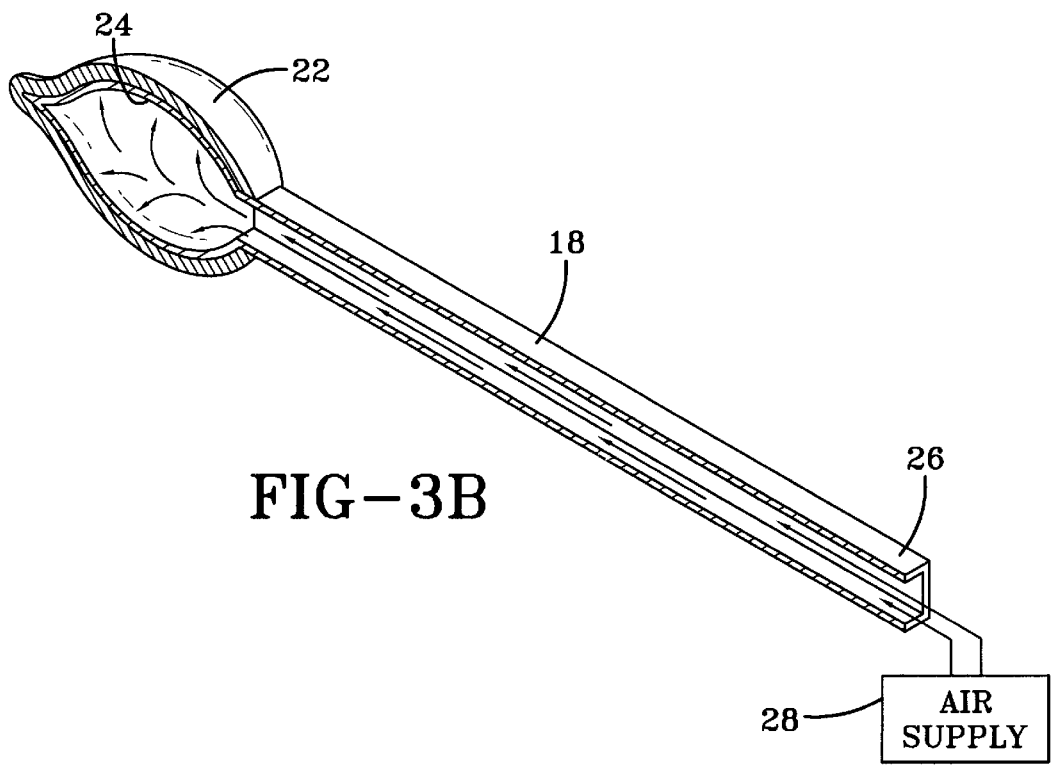

As shown in FIG. 3, a portion of the extruded shape 18, such as an end 24 of the extruded shape, is placed in the blow mold 22 while another portion 26 of the extruded shape 18 such as the opposite end, is adapted to receive air 28 to inject into the hollow shape while the end in the blow mold is subjected to heat. As the air fills the extruded shape 18, it causes the heated end 24 to expand to form in the shape of the mold cavity in which it is secured. The air 28 is injected for a sufficient time to enable the heated end 24 of the extruded shape 18 to fill the blow mold cavity 22 and take the shape of the blow mold cavity. As the heat is reduced, the heated end begins to cool into the shape of the blow mold cavity. When the end has sufficiently cooled, the blow mold may be removed from the product.

Figure 1:
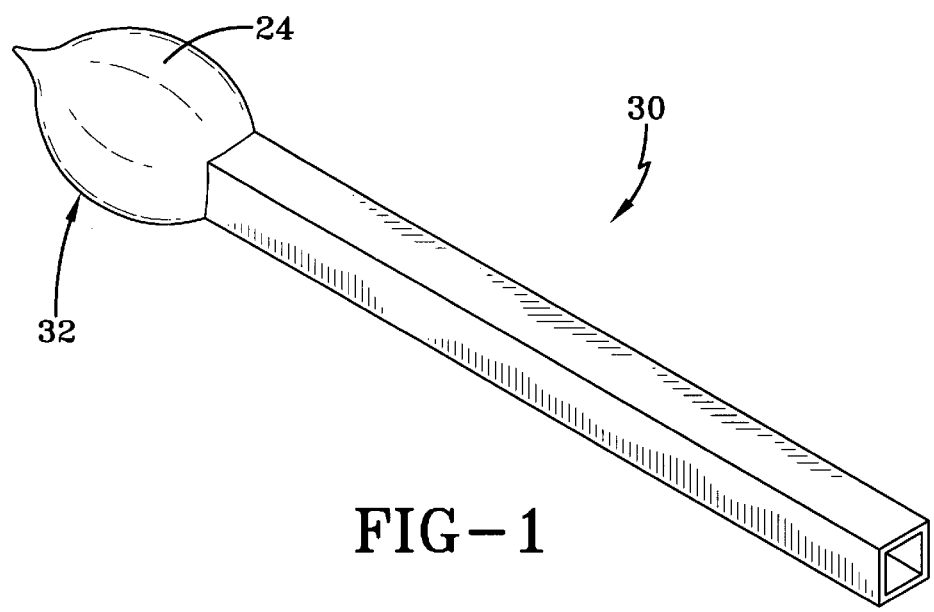
FIG. 1 is a perspective view of an exemplary product made from a preferred embodiment of the manufacturing process of the present invention.

As shown in FIG. 1, the end result is a product 30 that is extruded and has a decorative or otherwise specially formed shape 32 created on an end 24 thereof without the use of a separate part that must be assembled to the extruded part. At least two major benefits exist from this process. The first benefit is that assembly of a separate part onto the extruded part is no longer necessary. The second benefit is that whenever assembly of two parts is required, there is always the chance that the assembly will later fail, but by using the present invention, there is no end-cap installed on the post that may later risk falling off or otherwise becoming disengaged from the post.

The invention has been described with respect to preferred embodiments but it is to be recognized that the claims are not limited to the preferred embodiments which have been provided for example purposes. The claims are to be construed in accordance with their broadest possible legal interpretation.

What is claimed is:

1. A manufacturing process, comprising:

extruding a product shape through an extruder;

placing an end portion of said extruded product shape in a blow mold;

injecting air into said product shape while having heated the end portion of said product shape that is in said blow mold, resulting in expansion of said material inside said blow mold to take the shape of said blow mold cavity; and allowing the product shape to cool and releasing the blow mold to provide an extruded fence post having a specially formed end formed by a blow molding process.

2. The manufacturing process of claim 1, wherein said fence post is hollow.

3. The manufacturing process of claim 1, wherein said end portion of said extruded product shape placed in a blow mold, results in the formation of a decorative end to said fence post.

4. The manufacturing process of claim 3 wherein said decorative end is a cap.

5. The manufacturing process of claim 1 wherein said specially formed end is a cap.

6. A manufacturing process, comprising:

extruding a product shape through an extruder;

placing an end portion of said extruded product shape in a blow mold;

injecting air into said product shape while having heated the end portion of said product shape that is in said blow mold, resulting in expansion of said material inside said blow mold to take the shape of said blow mold cavity; and allowing the product shape to cool and releasing the blow mold to provide an extruded rail post having a specially formed end formed by a blow molding process.

7. The manufacturing process of claim 6, wherein said end portion of said extruded product shape placed in a blow mold, results in the formation of a decorative end to said rail post.

8. The manufacturing process of claim 7 wherein said decorative end is a cap.

9. The manufacturing process of claim 6, wherein said rail post is hollow.

10. The manufacturing process of claim 6, wherein said specially formed end is a cap.

* * * * *